United States Patent
Uematsu et al.

(10) Patent No.: US 6,785,224 B2
(45) Date of Patent: Aug. 31, 2004

(54) RING CONFIGURING METHOD AND NODE APPARATUS USED IN THE RING

(75) Inventors: Kumiko Uematsu, Kawasaki (JP); Hiroshi Kanzawa, Kawasaki (JP); Takashi Honda, Kawasaki (JP); Junichi Moriyama, Kawasaki (JP); Kazunari Shiota, Fukuoka (JP); Hidetoshi Kawamura, Fukuoka (JP); Isao Takata, Fukuoka (JP); Yukie Yoshihara, Fukuoka (JP); Kanji Naito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 839 days.

(21) Appl. No.: 09/748,672

(22) Filed: Dec. 26, 2000

(65) Prior Publication Data

US 2001/0019540 A1 Sep. 6, 2001

(30) Foreign Application Priority Data

Mar. 6, 2000 (JP) .................................... 2000-061092
Jul. 26, 2000 (JP) .................................... 2000-225728

(51) Int. Cl.[7] ............................................. H04L 12/28
(52) U.S. Cl. ....................................... 370/222; 370/258
(58) Field of Search ............................... 370/222, 223, 370/224, 254, 255, 257, 258, 522, 527, 529

(56) References Cited

U.S. PATENT DOCUMENTS

| | | | | |
|---|---|---|---|---|
| 5,003,533 A | * | 3/1991 | Watanabe | 370/258 |
| 5,282,200 A | * | 1/1994 | Dempsey et al. | 370/245 |
| 5,442,620 A | * | 8/1995 | Kremer | 370/224 |
| 5,826,038 A | * | 10/1998 | Nakazumi | 370/222 |
| 6,614,754 B1 | * | 9/2003 | Usuba et al. | 370/222 |

FOREIGN PATENT DOCUMENTS

JP          09-093278          4/1997

* cited by examiner

Primary Examiner—Chau Nguyen
Assistant Examiner—Richard Chang
(74) Attorney, Agent, or Firm—Katten Muchin Zavis Rosenman

(57) ABSTRACT

A ring configuring method configures a network in which a plurality of nodes are connected linearly, and performs topology construction for the ring by circulating topology data through the respective nodes and collecting connection information of the respective nodes. The method includes the steps of providing in the topology data a flag indicating whether the connection information is collected in each node; inverting the flag at a terminal station which is an end node of the open ring, and turning the topology data there; causing the topology data to passing through a node other than any terminal station as it is; and adding the connection information to the topology data in each node according to the flag, and performing topology construction.

9 Claims, 20 Drawing Sheets

FIG. 17

| TIME | A(ID=2)⇒B NN 0 1 2 3 4 | B(ID=8)⇒C NN 0 1 2 3 4 | C(ID=3)⇒D NN 0 1 2 3 4 | D(ID=A)⇒A NN 0 1 2 3 4 |
|---|---|---|---|---|
| T01 | 00 2 0 0 0 0 ... | 00 8 0 0 0 0 ... | 00 3 0 0 0 0 ... | 00 A 0 0 0 0 ... |
| T02 | 00 2 0 0 0 0 ... | 01 2 8 0 0 0 ... | 00 3 0 0 0 0 ... | 01 3 A 0 0 0 ... |
| T03 | 00 2 0 0 0 0 ... | 01 2 8 0 0 0 ... | 02 2 8 3 0 0 ... | 01 3 A 0 0 0 ... |
| T04 | 00 2 0 0 0 0 ... | 01 2 8 0 0 0 ... | 02 2 8 3 0 0 ... | 03 2 8 3 A 0 ... |
| T05 | 13 2 8 3 A 0 ... | 01 2 8 0 0 0 ... | 02 2 8 3 0 0 ... | 03 2 8 3 A 0 ... |
| T06 | 13 2 8 3 A 0 ... | 13 2 8 3 A 0 ... | 02 2 8 3 0 0 ... | 03 2 8 3 A 0 ... |
| T07 | 13 2 8 3 A 0 ... | 13 2 8 3 A 0 ... | 13 2 8 3 A 0 ... | 03 2 8 3 A 0 ... |
| T08 | 13 2 8 3 A 0 ... | 13 2 8 3 A 0 ... | 13 2 8 3 A 0 ... | 13 2 8 3 A 0 ... |
| T09 | 13 2 8 3 A 0 ... | 13 2 8 3 A 0 ... | 13 2 8 3 A 0 ... | 13 2 8 3 A 0 ... |

FIG. 19

| TIME | Aa(ID=2)⇒B<br>NN 0 1 2 3 4 | B(ID=8)⇒Ac<br>NN 0 1 2 3 4 | Ac(ID=2)⇒D<br>NN 0 1 2 3 4 | D(ID=A)⇒Aa<br>NN 0 1 2 3 4 |
|---|---|---|---|---|
| T01 | 00 2 0 0 0 0 ... | 00 8 0 0 0 0 ... | 00 2 0 0 0 0 ... | 00 A 0 0 0 0 ... |
| T02 | 00 2 0 0 0 0 ... | 81 2 8 0 0 0 ... | 01 8 2 0 0 0 ... | 81 2 A 0 0 0 ... |
| T03 | 00 2 0 0 0 0 ... | 81 2 8 0 0 0 ... | 81 2 8 0 0 0 ... | 82 8 2 A 0 0 ... |
| T04 | 00 2 0 0 0 0 ... | 81 2 8 0 0 0 ... | 81 2 8 0 0 0 ... | 02 2 8 A 0 0 ... |
| T05 | 12 2 8 A 0 0 ... | 81 2 8 0 0 0 ... | 81 2 8 0 0 0 ... | 02 2 8 A 0 0 ... |
| T06 | 12 2 8 A 0 0 ... | 92 2 8 A 0 0 ... | 81 2 8 0 0 0 ... | 02 2 8 A 0 0 ... |
| T07 | 12 2 8 A 0 0 ... | 92 2 8 A 0 0 ... | 92 2 8 A 0 0 ... | 02 2 8 A 0 0 ... |
| T08 | 12 2 8 A 0 0 ... | 92 2 8 A 0 0 ... | 92 2 8 A 0 0 ... | 12 2 8 A 0 0 ... |
| T09 | 12 2 8 A 0 0 ... | 92 2 8 A 0 0 ... | 92 2 8 A 0 0 ... | 12 2 8 A 0 0 ... |

FIG. 21

| TIME | C(1)→A(2) M | A(2)→B(2) M | B(2)→E(1) S | E(1)→D(1) M | D(1)→F(1) S | F(1)→D(2) M | D(2)→E(2) M | E(2)→B(1) S | B(1)→A(1) M | A(1)→C(1) S |
|---|---|---|---|---|---|---|---|---|---|---|
|  | NN012345 | NN012345 | NN012345 | NN012345 | NN012345 | NN012345 | NN012345 | NN012345 | NN012345 | NN012345 |
| T1 | 00F00000 | 00800000 | 00200000 | 00500000 | 00400000 | 00900000 | 00400000 | 00500000 | 00200000 | 00800000 |
| T2 | 81BF0000 | 00800000 | 01820000 | 01250000 | 01540000 | 81490000 | 00400000 | 01450000 | 00200000 | 01280000 |
| T3 | 8228F000 | 00800000 | 01820000 | 02825000 | 02254000 | 82549000 | 00400000 | 01450000 | 00200000 | 01280000 |
| T4 | 8228F000 | 8228F000 | 01820000 | 02825000 | 03825400 | 84825490 | 00400000 | 01450000 | 00200000 | 01280000 |
| T5 | 8228F000 | 8228F000 | 8228F000 | 02825000 | 03825400 | 84825490 | 83254900 | 83254900 | 00200000 | 01280000 |
| T6 | 8228F000 | 8228F000 | 8228F000 | 8228F000 | 03825400 | 84825490 | 84825490 | 84825490 | 00200000 | 01280000 |
| T7 | 8228F000 | 8228F000 | 8228F000 | 8228F000 | 8228F000 | 84825490 | 84825490 | 84825490 | 00200000 | 01280000 |
| T8 | 8228F000 | 8228F000 | 8228F000 | 8228F000 | 8228F000 | 0328F900 | 84825490 | 84825490 | 00200000 | 01280000 |
| T9 | 8228F000 | 8228F000 | 8228F000 | 8228F000 | 8228F000 | 0328F900 | 0428F940 | 0528F945 | 00200000 | 01280000 |
| T10 | 8228F000 | 8228F000 | 8228F000 | 8228F000 | 8228F000 | 0328F900 | 0428F940 | 0528F945 | 00200000 | 01280000 |
| T11 | 8228F000 | 8228F000 | 8228F000 | 8228F000 | 8228F000 | 8228F000 | 0428F940 | 0528F945 | 00200000 | 01280000 |
| T12 | 8228F000 | 8228F000 | 8228F000 | 8228F000 | 8228F000 | 8228F000 | 0428F940 | 0528F945 | 00200000 | 01280000 |
| T13 | 9528F945 | 8228F000 | 8228F000 | 8228F000 | 8228F000 | 8228F000 | 0428F940 | 0528F945 | 1528F945 | 1528F945 |
| T14 | 9528F945 | 9528F945 | 8228F000 | 8228F000 | 8228F000 | 8228F000 | 0428F940 | 0528F945 | 1528F945 | 1528F945 |
| T15 | 9528F945 | 9528F945 | 9528F945 | 8228F000 | 8228F000 | 8228F000 | 0428F940 | 0528F945 | 1528F945 | 1528F945 |
| T16 | 9528F945 | 9528F945 | 9528F945 | 9528F945 | 8228F000 | 8228F000 | 0428F940 | 0528F945 | 1528F945 | 1528F945 |
| T17 | 9528F945 | 9528F945 | 9528F945 | 9528F945 | 9528F945 | 8228F000 | 0428F940 | 0528F945 | 1528F945 | 1528F945 |
| T18 | 9528F945 | 9528F945 | 9528F945 | 9528F945 | 9528F945 | 1528F945 | 0428F940 | 0528F945 | 1528F945 | 1528F945 |
| T19 | 9528F945 | 9528F945 | 9528F945 | 9528F945 | 9528F945 | 1528F945 | 1528F945 | 0528F945 | 1528F945 | 1528F945 |
| T20 | 9528F945 | 9528F945 | 9528F945 | 9528F945 | 9528F945 | 1528F945 | 1528F945 | 1528F945 | 1528F945 | 1528F945 |

RING CONFIGURING METHOD AND NODE APPARATUS USED IN THE RING

BACKGROUND OF THE INVENTION

1. Field of the Invention

The present invention relates to a ring configuring method and a node apparatus used in the ring, and, in particular, to a ring configuring method and a node apparatus used in the ring in which protection according to a manner of a bidirectional line switched ring can be performed by an open-ring configuration.

2. Description of the Related Art

Recently, a bidirectional line switched ring (BLSR) is mainly used as a configuration of a network of optical transmission apparatuses.

By a BLSR, one time slot in a line is used by a plurality of paths, and another time slot is possessed as a spare in common by the plurality of paths, and, thereby, high line holding efficiency can be achieved.

Further, as a line comes to have a large capacity, a large-scale configuration such that a distance between optical transmission apparatuses is several hundreds of kilometers is achieved.

However, when a network is constructed, there is a case where, from the view points of costs of setting and operating optical transmission apparatuses and so forth, all the apparatuses are not set so as to form a ring at once, but the number of optical transmission apparatuses is increased gradually, thus the network is enlarged, and, finally, a BLSR is formed thereof and is operated.

For example, as shown in FIG. 1, nodes (optical transmission apparatuses) A and B are connected by optical fibers, and, then, nodes B and C are connected by optical fibers. Thus, a linear configuration (that is, an open-ring configuration) is formed.

Then, when a node D is added, as shown in FIG. 2, the node D is connected to the nodes A and C by optical fibers, respectively. Thus, a ring configuration is formed. Then, a switching protocol is changed from a linear switching protocol into a BLSR switching protocol.

In a linear configuration, only span switching using a short path between nodes between which a fault occurs is available. In contrast to this, in a ring configuration, not only span switching using a short path between nodes between which a fault occurs but also ring switching using a long path are available.

Accordingly, in order to enable the BLSR switching protocol to properly function, it is necessary to construct a topology table and squelch tables for each node (as disclosed in Japanese Laid-Open Patent Application No. 9-93278, 'Ring Transmission System and Squelch Method for the System', filed by the present applicant).

A topology table holds topology which is node connection information indicating an arrangement of nodes forming a ring. A squelch table holds a fault condition such as to disconnect each path so as to prevent a signal in the erroneous path from being output due to BLSR switching at a time of a occurrence of a fault.

A squelch table is set for each path based on a topology table. Accordingly, when the number of paths passing through a single optical fiber is as large as tens through hundreds, it is very difficult to set the squelch tables at once accurately.

In the related art, there is an art of automatically constructing a topology table and squelch tables for a ring configuration. However, it is not possible to apply this art to a linear configuration, and to automatically construct a topology table and squelch tables.

Further, k1 and k2 bytes of a line overhead of a main signal of a SONET (Synchronous Optical NETwork) are used in common by a linear switching protocol and a BLSR switching protocol. However, methods of using the respective bytes are different.

Accordingly, when switching is performed due to an occurrence of a fault in the middle of a change of a switching protocol from a linear switching protocol to a BLSR switching protocol, an erroneous operation is performed for dealing with (or relieving from) the fault. In order to prevent such an erroneous operation from being performed, it is necessary to stop both switching protocols when a switching protocol is changed.

As it is necessary to construct a topology table and squelch tables for each node during the stopping of the switching protocols, it is not possible to perform the change of switching protocol smoothly within a short time.

SUMMARY OF THE INVENTION

The present invention has been devised in consideration of the above-described problems, and an object of the present invention is to provide a ring configuration method and a node apparatus used the ring in which it is possible to construct topology necessary for a BLSR configuration in an open-ring configuration, and, to perform switching by a BLSR switching protocol in the open-ring configuration.

A ring configuring method of configuring a network in which a plurality of nodes are connected linearly, and performing topology construction for the ring by circulating topology data through the respective nodes and collecting connection information of the respective nodes, according to the present invention, comprises the steps of:

a) providing in the topology data a flag indicating whether the connection information is collected in each node;

b) inverting the flag at a terminal station which is an end node of the open ring, and turning the topology data there;

c) causing the topology data to pass through a node other than any terminal station as it is; and d) adding the connection information to the topology data in each node according to the flag, and performing topology construction.

Through the steps of b), c) and d), it is possible to automatically perform topology construction, in an open ring, necessary for a BLSR, and, based thereon, to construct squelch tables.

The method may further comprises the steps of:

e) sending the topology data in any direction from any node, and circulating the topology data in the ring; and f) receiving the topology data by the node in a direction opposite to that of the step e), and performing topology construction.

Through the steps of e) and f), it is possible to automatically perform topology construction, in an open ring, necessary for a BLSR.

The method may further comprise the steps of:

e) sending the topology data in both directions from any node, and circulating the topology data in the ring; and f) configuring the topology when the topology data received by the node in directions opposite to those of the step e), respectively, coincides.

Through the steps of e) and f), it is possible to automatically perform topology construction, in an open ring, necessary for a BLSR.

A node apparatus of a network in a configuration of a ring in which a plurality of nodes are connected linearly, according to the present invention, comprises:

a collecting/passing control part receiving topology data circulating the ring, and transmitting the topology data after adding an own node ID when a flag provided in the topology data indicates to collect connection information, but causing the topology data to pass through the own apparatus when the flag indicates not to collect the connection information; and a turning/passing control part turning the topology data after inverting the flag in a case where the own apparatus is a terminal station which is an end node of the open ring, but causing the topology data to pass through the own apparatus leaving the flag as it is in a case where the own apparatus is not any terminal station.

Through turning the topology data after inverting the flag in a case where the own apparatus is a terminal station which is an end node of the open ring, but causing the topology data to pass through the own apparatus leaving the flag as it is in a case where the own apparatus is not any terminal station, and performing topology construction in each node according to the flag, it is possible to automatically perform topology construction, in an open ring, necessary for a BLSR, and, based thereon, to construct squelch tables.

The node apparatus may further comprise a one-direction transmitting part transmitting the topology data in one direction, and circulating the topology data in the ring, and
receiving the topology data in a direction opposite to the one direction, and performing topology construction.

Thereby, it is possible to automatically perform topology construction, in an open ring, necessary for a BLSR.

The node apparatus may further comprise:

a both-direction transmitting part transmitting the topology data in both directions, and circulating the topology data in the ring; and a comparing part comparing the topology data received in directions opposite to the both directions, respectively, and performing topology construction when a result of comparison of the comparing part is a coincidence.

Thereby, it is possible to automatically perform topology construction, in an open ring, necessary for a BLSR.

The node apparatus may further comprise a lockout-work ring part stopping ring switching of a manner of a bidirectional line switched ring when a ring fault occurs such that neither a work line nor a protection line connected to either side of the own apparatus can be used.

Thereby, it is possible to perform switching according to a BLSR switching protocol in an open ring, and, at this time, to prevent unnecessary line disconnection from occurring.

The node apparatus may further comprise:

a fixed-value setting part setting a fixed value to the flag when the own apparatus is set as a master; and a changing part comparing the node ID of the own apparatus with the top node ID of the received topology data when the own apparatus is set as a master, and changing the own apparatus to a slave when the own apparatus cannot become the top of the topology data.

Thereby, even when a plurality of node apparatuses are set as masters, it is possible to reduce the masters so that a single node apparatus is a master, and, thereby, to perform topology construction so as to obtain single topology data.

The node apparatus may make setting as to whether the own apparatus is a master or a slave independently in a part transmitting the topology data in one direction and circulating the topology data in the ring and another part transmitting the topology data in the other direction and circulating the topology data in the ring.

Thereby, it is possible to set topology data individually for the part performing circulation in one direction and the other part performing circulation in the other direction, and, thereby, to improve the degree of freedom in setting topology data.

Other objects and further features of the present invention will become more apparent from the following detailed description when read in conjunction with the accompanying drawings.

BRIEF DESCRIPTION OF THE DRAWINGS

FIG. 17 shows a time table of topology data in the case of FIG. 16;

FIG. 19 shows a time table of topology data in the case of FIG. 18;

FIG. 21 shows a time table of topology data in the case of FIG. 20.

DETAILED DESCRIPTION OF THE PREFERRED EMBODIMENTS

Figure 1:
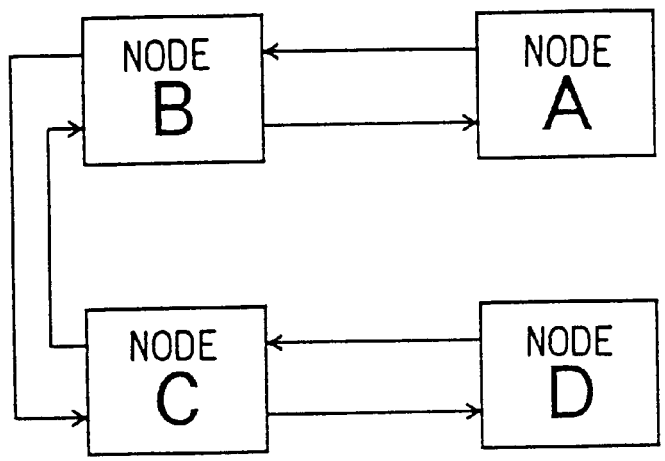
FIG. 1 shows a configuration of one example of a network in a linear configuration.
Figure 2:
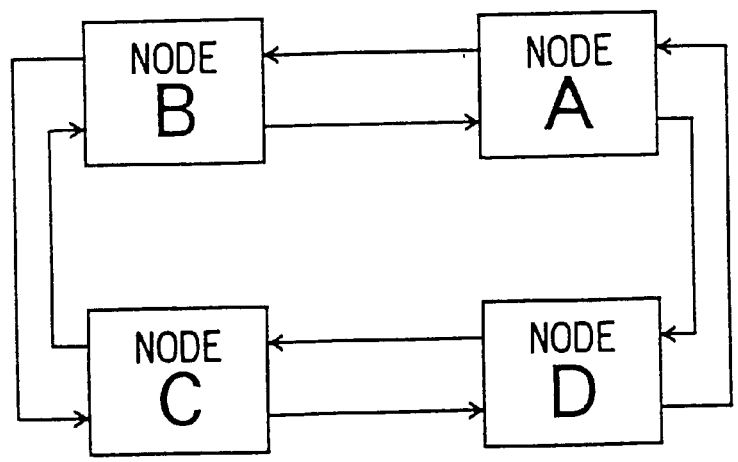
FIG. 2 shows a configuration of one example of a network in a ring configuration.
Figure 3:
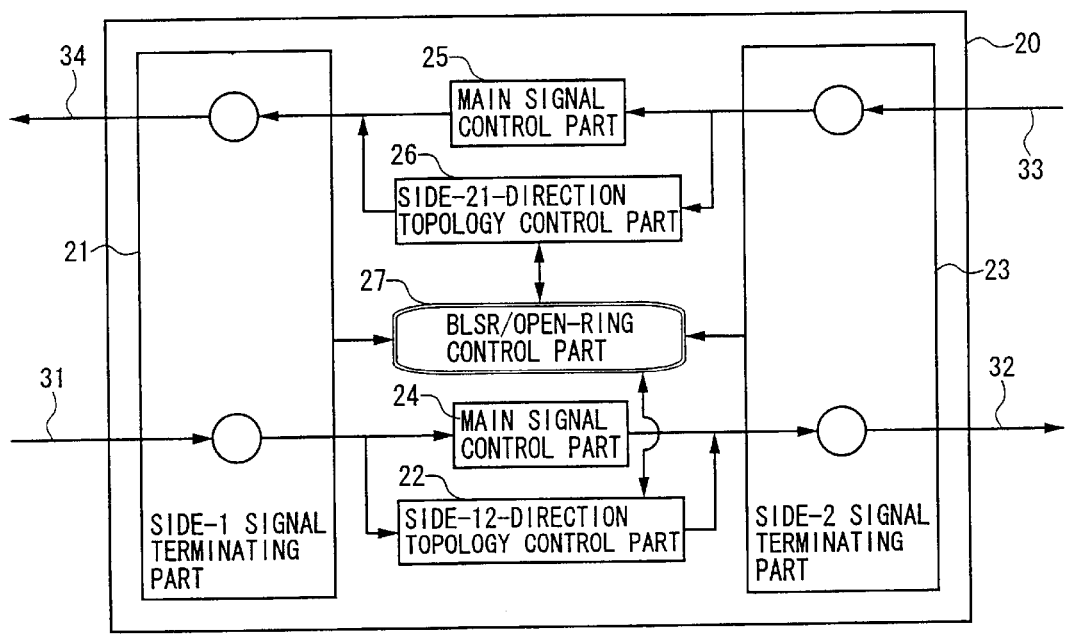
FIG. 3 shows a block diagram of a first embodiment of a node apparatus according to the present invention.

FIG. 3 shows a block diagram of a node apparatus 20 in a first embodiment of the present invention.

In the node apparatus 20, a side-1 signal terminating part 21 receives a main signal and topology data coming through an optical fiber 31, provides the topology data to a side-12-direction topology control part 22 and provides the main signal to a main signal control part 24.

The side-12-direction control part 22 provides the received topology signal to a BLSR/open-ring control part 27, and performs processing of the topology data, that is, adding a node ID (that is, collection of node connection information) and holding of the topology data (that is, setting of the node connection information) based on control by the BLSR/open-ring control part 27.

The topology data output by the side-12-direction topology control part 22 and the main signal output from the main signal control part 24 are sent out to an optical fiber 32 through a side-2 signal terminating part 23.

Further, the side-2 signal terminating part 23 receives a main signal and topology data coming through an optical fiber 33, provides the topology data to a side-21-direction topology control part 26 and provides the main signal to a main signal control part 25.

The side-21-direction control part 26 provides the received topology signal to the BLSR/open-ring control part 27, and performs processing of the topology data, that is, adding a node ID and holding of the topology data based on control by the BLSR/open-ring control part 27.

The topology data output by the side-21-direction topology control part 26 and the main signal output from the main signal control part 25 are sent out to an optical fiber 34 through the side-1 signal terminating part 21.

Although, in the above-described first embodiment, both the side-12-direction topology control part 22 and side-21-direction topology control part 26 are provided, the present invention can be embodied when any one of the side-12-direction topology control part 22 and side-21-direction topology control part 26 is provided.

The BLSR/open-ring control part 27 holds BLSR/open-ring identification information. The BLSR open-ring identification information can be changed by an operator. Further, the BLSR/open-ring control part 27 has information of connection of optical fibers provided by each of the side-1 signal terminating part 21 and side-2 signal terminating part 23.

Figure 4:
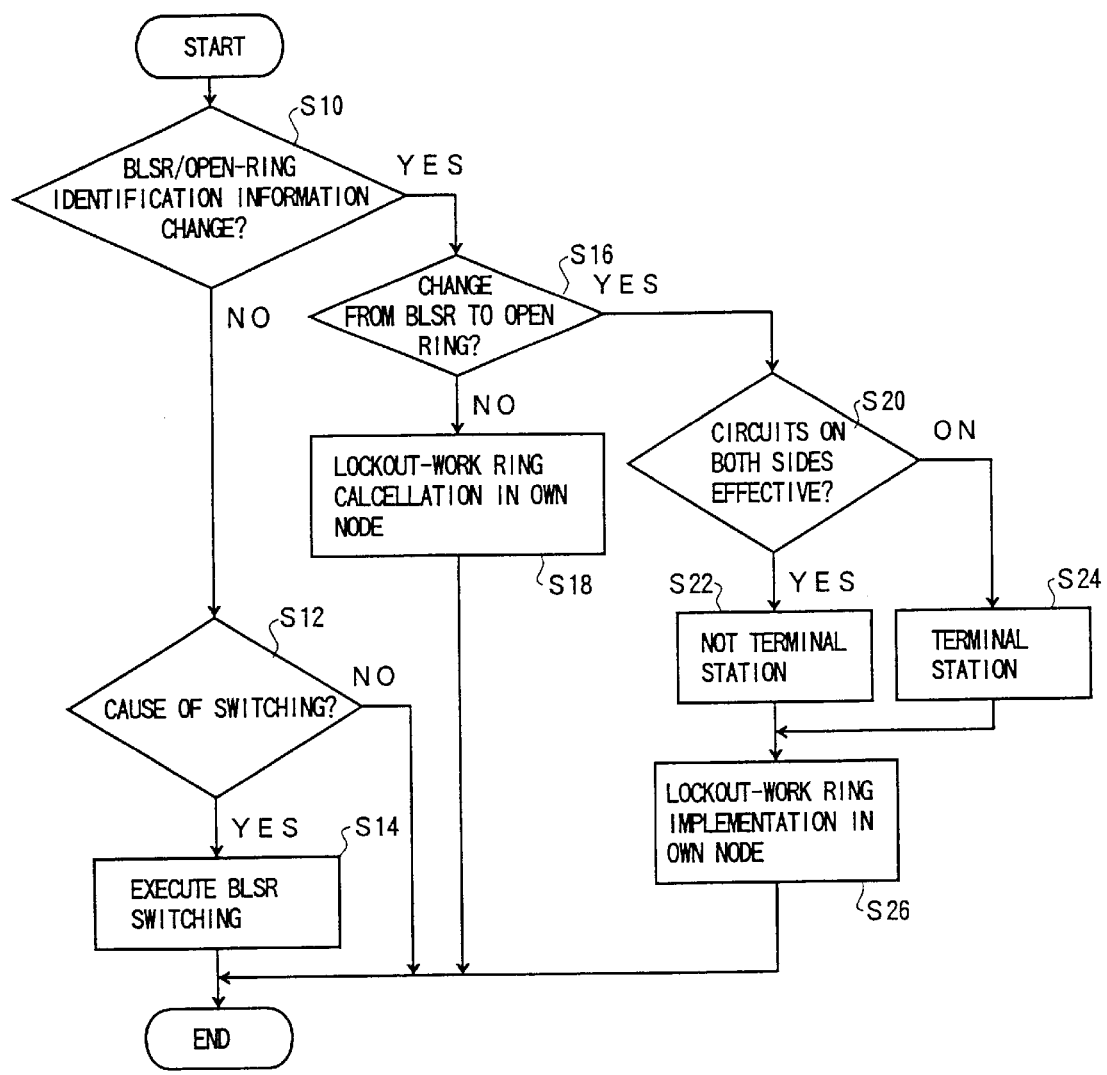
FIG. 4 shows a flow chart of one embodiment of a switching control process executed by a BLSR/open-ring control part shown in FIG. 3.

FIG. 4 shows a flow chart of one embodiment of a switching control process executed by the BLSR/open-ring control part 27. Execution of this process is started when setting of the BLSR/open-ring identification information is changed or a fault occurs.

In FIG. 4, first, in a step S10, it is determined whether or not setting of the BLSR/open-ring identification information is changed. Then, when setting of the BLSR/open-ring identification information is not changed, a step S12 is executed, and it is determined whether or not a cause of switching such as a fault has occurred. Then, when a cause of switching has occurred, BLSR switching is performed in a step S14, and the process is finished.

However, when setting of the BLSR/open-ring identification information is changed in the step S10, a step S16 is executed, and it is determined whether or not change is made from a BLSR to an open-ring. Then, when change is not made from a BLSR to an open-ring, that is, change is made from an open-ring to a BLSR, the own node is made to enter a lockout-work ring cancellation condition and the process is finished in a step S18.

When, in the step S16, change is made from a BLSR to an open-ring, a step S20 is executed, and it is determined whether or not optical fibers are effectively connected to both sides of the side-1 signal terminating part 21 and side-2 signal terminating part 23.

When the optical fibers are effectively connected to both sides in the step S20, it is determined in a step S22 that the own node is not a terminal station (but a repeating station). However, when the optical fibers are not effectively connected to both sides in the step S20, it is determined in a step S24 that the own node is a terminal station. The BLSR/open-ring control part 27 sends information of the above-mentioned determination as to whether or not the own node is a terminal station to the side-12-direction topology control part 22 and side-21-direction topology control part 26.

Then, because change is made to an open-ring, the own node is made to enter a lockout-work ring implementation condition in a step S26, and the process is finished. Lock-out work-ring implementation is a control such that relief from a ring fault, if occurs, is not performed, in which fault a protection line as well as a work line cannot be used through the optical fibers connected to both sides of the own node, that is, ring switching is not performed.

For topology construction, D5#5 through #12, D6#5 through #12, D7#5 through #12 bytes in a line overhead of SONET are used.

Figure 5A:
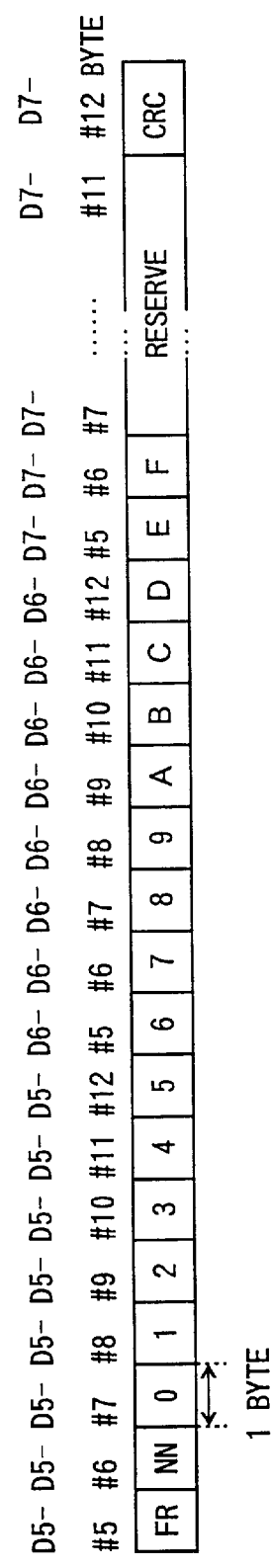
FIGS. 5A and 5B show a frame format of topology data.

FIG. 5A shows a frame format of topology data.

The D5#5 byte is a frame byte FR, has a value C3 (duodecimal notation) and indicates the top of data. The D5#6 byte is a node number NN, and indicates which position of D5#7 through D7#6 a transmission node inserted a node ID into. The D5#7 through D7#6 bytes are a topology data part. The D7#7 through D7#11 are reserve for being used for other purposes. D7#12 is an error detection code CRC provided for the total 23 bytes from the above-mentioned frame byte FR to the reserve.

Figure 5B:
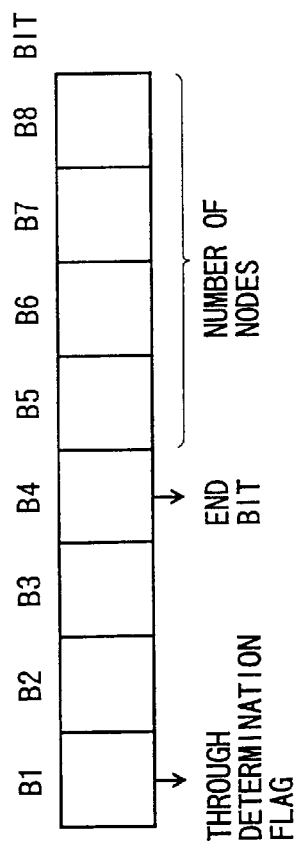

FIG. 5B shows the details of the node number NN.

The first bit B1 is a through determination flag, and the fourth bit B4 is an end bit. The fifth through eight bits are the number of nodes.

Figure 6:
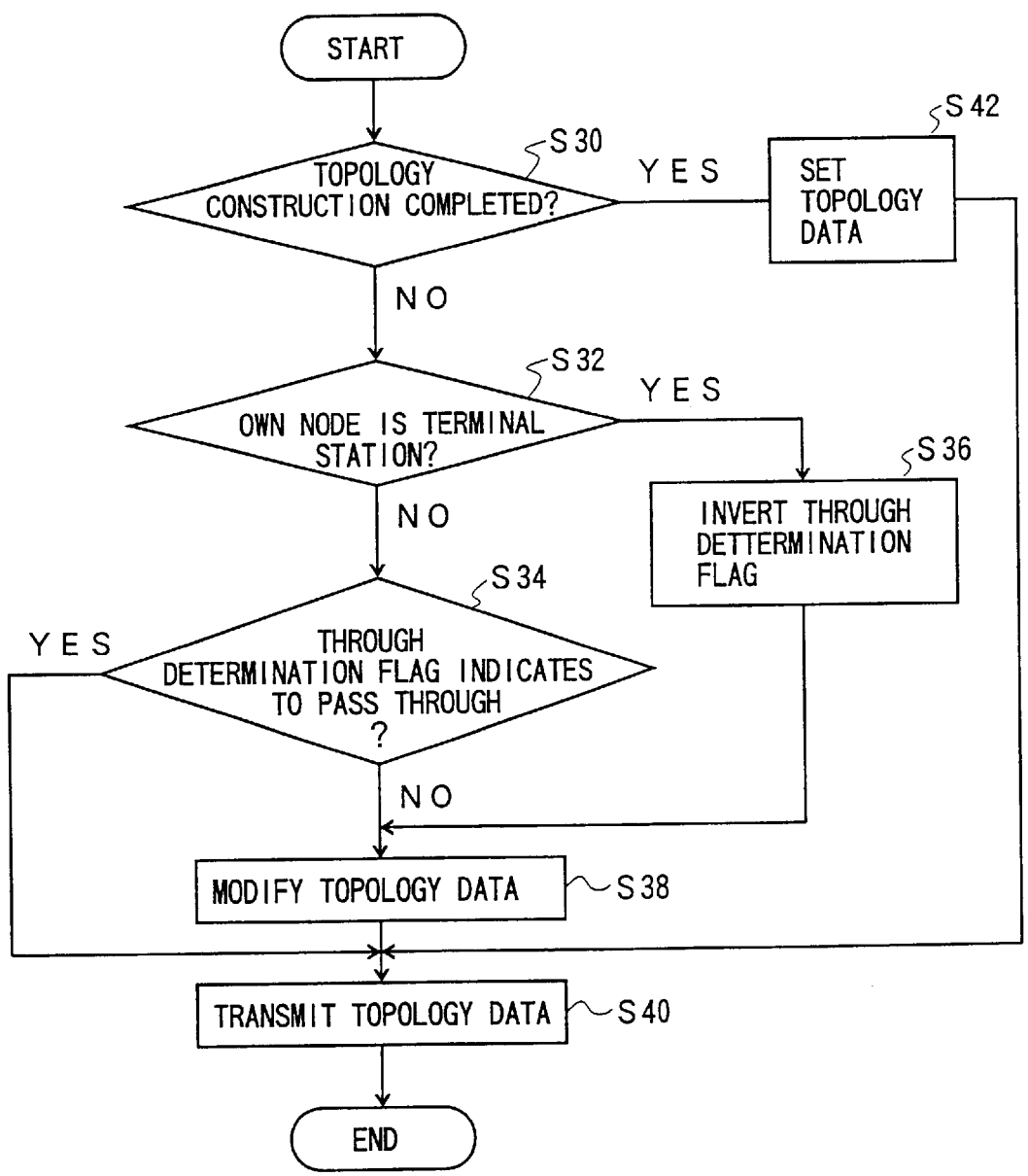
FIG. 6 shows a flow chart of one embodiment of a topology automatic construction process executed by a side-12-directyion topology control part or a side-21-direcytion topology control part shown in FIG. 3.

FIG. 6 shows a flow chart of a topology automatic construction process executed by the side-12-direction topology control part 22 or side-21-direction topology control part 26.

This process is commenced when a received value of topology data has changed, or a topology construction command is given.

In FIG. 6, when topology data is received, first, in a step S30, it is determined whether or not the end bit B4 of the node number NN of the received topology data is "1", and indicates that node connection information (or topology) of all the nodes constituting the ring (which may be an open ring) has been already collected, and the topology data is to be set in a topology table.

On the other hand, when the end bit B4 is "0", and indicates that node connection information (or topology) of the respective nodes are now being collected, a step S32 is then executed. Also, when a topology construction command is given, the step S32 is executed.

In the step S32, it is determined whether or not the own node is a terminal station. When the determination information sent from the BLSR/open-ring control part 27 indicates that the own node is not a terminal station, a step S34 is executed. Then, in the step S34, it is determined whether or not the through determination flag B1 of the node number NN of the topology data instructs to construct (collect). When the through determination flag B1 instructs to construct (collect), a step S38 is executed. However, when the through determination flag B1 is "0" and instructs to cause to pass through, the step S38 is bypassed and a step S40 is performed.

On the other hand, when it is determined in the step S32 that the own node is a terminal station, a step S36 is executed, and, after the value of the through determination flag B1 of the node number NN is inverted, the step S38 is executed.

In the step S38, the topology data is modified.

Specifically, when a topology construction command was given, the own node ID is inserted in the D5#7 byte of the topology data, the end bit is dropped to "0", and all the other bytes of the topology data are set to "0".

However, when the topology data was received, the own node ID is compared with the contents (node ID of the master) of the D5#7 byte of the received topology data. Then, when the own node ID>D5#7, "1" is added to the value of the number of nodes of the NN byte (node number NN) of the received topology data, and, thus, the value of the number of nodes of the NN bytes is updated. Then, the own node ID is inserted into the byte which is the X-th from the D5#7 byte of the topology data part.

However, when the own node ID=D5#7, "1" is set to the end bit of the NN byte of the received topology data, and all the other bits of the received topology data are kept unchanged.

On the other hand, when the own node ID<D5#7, the own node ID is inserted into the D5#7 byte of the topology data, the end bit is dropped to "0", and all the other bytes of the topology data are set to 0.

After the step S38 is executed, a step S40 is then executed. Then, the topology data is transmitted to an adjacent node, and the process is finished. At this time, when the own node is a terminal station, this transmission is made through the side (the side-1 signal terminating part 21 or side-2 signal terminating part 23) through which the topology data was received. However, when the own node is not a terminal station (but a repeating station) and the topology data was received through a side (for example, the side-1 signal terminating part 21), that transmission is made through the opposite side (side-2 signal terminating part 23 in the example).

On the other hand, in the step S30, when the end bit B4 of the received topology data is "1" and node connection information (or topology) of all the nodes has been already collected, the contents of the D5#7 through D7#6 and number of nodes of the node number NN of the received topology data are sent to the BLSR/open-ring control part 27 and are held in the topology table in a step S42. Then, in the step S40, the topology data having undergone topology construction (collection) is circulated in the ring again, and, thus, the topology data is made to be set in each node. When the topology data having the end bit B4 of 1 is received by the node to which the topology construction command was given, this topology data is discarded by this node, and the topology automatic construction is finished.

Two methods of performing topology automatic construction in an open ring will now be described.

The first method thereof is a method in which, from a node to which a topology construction command has been given, topology data is transmitted in one direction of any of the side-1 and side-2, and is circulated in the ring.

The second method thereof is a method in which, from a node to which a topology construction command has been given, topology data is transmitted in both directions of the side-1 and side-2, and is circulated in the ring.

Figure 7:
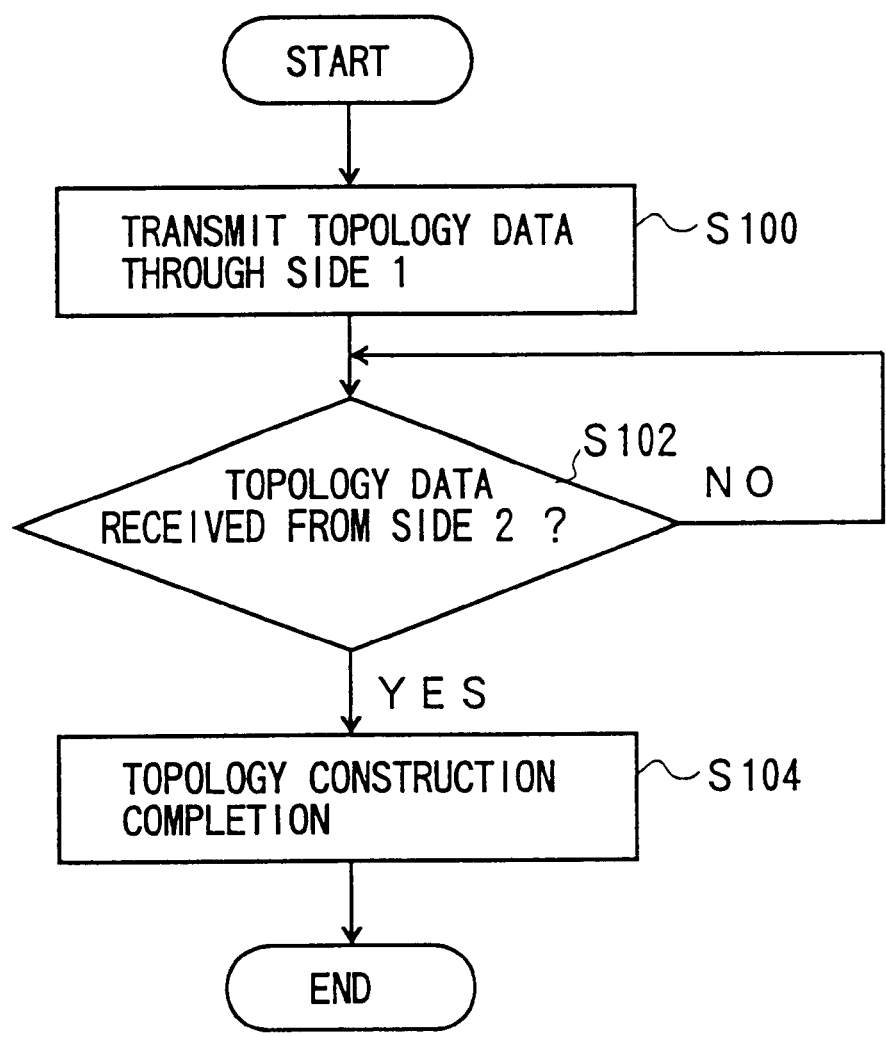
FIG. 7 shows a flow chart of a process executed by the BLSR/open-ring control part of a node to which a topology construction command is given, in a first embodiment of an open-ring topology construction method according to the present invention.

FIG. 7 shows a flow chart of a process executed by the BLSR/open-ring control part 27 of a node to which a topology construction command has been given, in a first embodiment of an open-ring topology construction method according to the present invention.

This process is commenced when a topology construction command is given.

In FIG. 7, the BLSR/open-ring control part 27 starts the side-21-direction topology data control part 26 in a step S100, sets the through determination flag to "1", that is, sets construction, also, sets the node ID of the own node to the top of the topology data part, and transmits the thus-obtained topology data for indicating the arrangement of the nodes in the ring, to an adjacent node through the side-1 signal terminating part 21.

Then, in a step S102, it is determined whether or not the topology data has been received at the side-2 signal terminating part 23 opposite to the side-1 signal terminating part 21 through which the topology data was transmitted. Then, only when the topology data has been received in the side-2 signal terminating part 23, a step S104 is executed.

In the step S104, it is recognized that the topology construction has been completed, the received topology data is set in the topology table of the BLSR/open-ring control part 27, and the process is finished.

Figure 8:
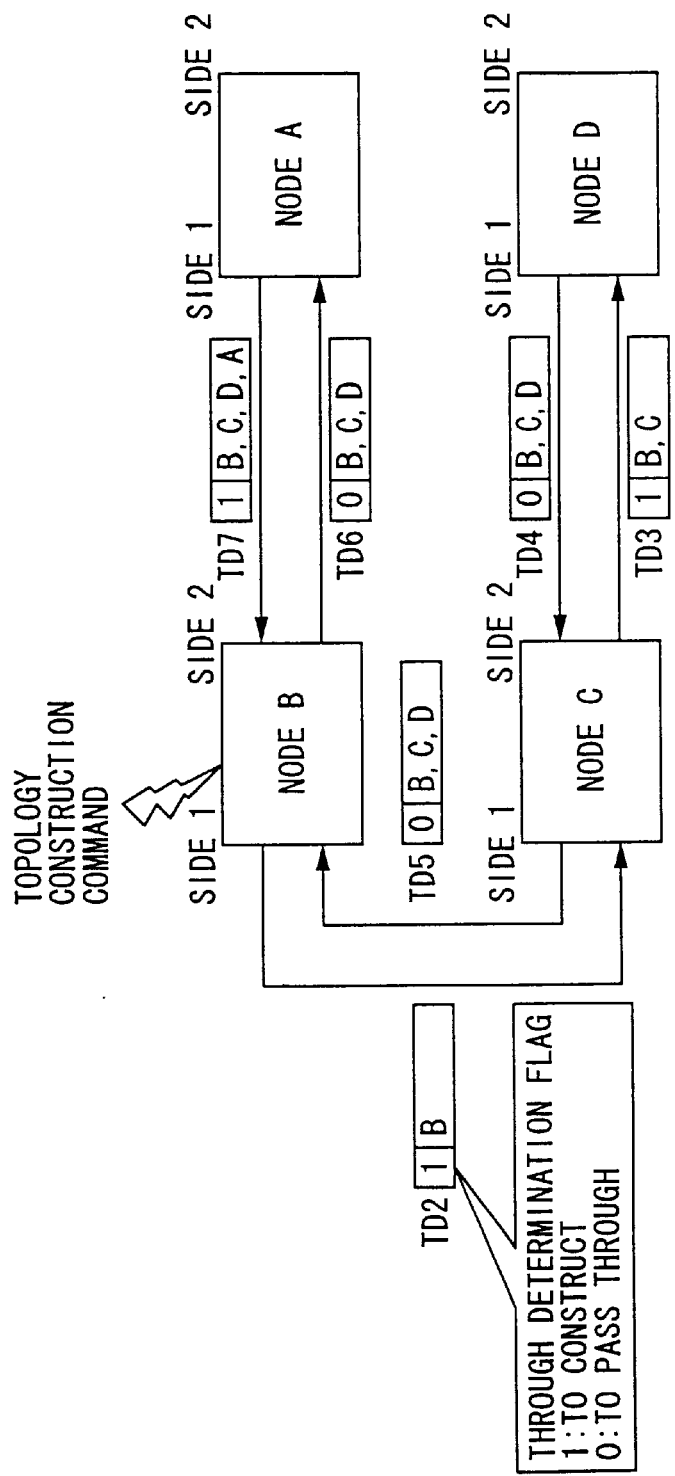
FIG. 8 illustrates operations of the first embodiment of the open-ring topology construction method according to the present invention.

FIG. 8 illustrates operations of the above-described first embodiment of the open-ring topology construction according to the present invention.

In FIG. 8, the side-1 signal terminating part 21 of a node A and the side-2 signal terminating part 23 of a node B are connected via optical fibers, the side-1 signal terminating part 21 of the node B and the side-1 signal terminating part 21 of a node C are connected via optical fibers, and the side-2 signal terminating part 23 of the node C and the side-1 signal terminating part 21 of a node D are connected via optical fibers, and thus, an open ring is configured thereby.

(1) An operator gives a topology construction command to the node B, for example.

(2) The node B then transmits topology data TD2 in which the through determination flag is set to "1", that is, construction is set, through the side-1 signal terminating part 21.

(3) The node C then receives the topology data TD2 through the side-1 signal terminating part 21 thereof and performs through determination. Then, because the through determination flag is "1", that is, construction is set, the node C transmits topology data TD3 in which the own node ID 'C' is added, through the side-2 signal terminating part 23.

(4) The node D then receives the above-mentioned topology data TD3 through the side-1 signal terminating part 21. Because the own node is a terminal station, the node D inverts the through determination flag from "1" to "0" (passing through), and transmits the thus-obtained topology data TD4 also in which the own node ID 'D' is added, through the side-1 signal terminating part 21 through which the topology data TD3 was received.

(5) The node C then receives the above-mentioned topology data TD4 through the side-2 signal terminating part 23, and performs through determination. Because the through determination flag is "0", that is, passing through is set, the node C transmits the unchanged topology data TD5, through the side-1 signal terminating part 21.

(6) The node B then receives the above-mentioned topology data TD5 through the side-1 signal terminating part 21, and performs through determination. Because the through determination flag is "0", that is, passing through is set, the node B transmits the unchanged topology data TD6, through the side-2 signal terminating part 23.

(7) The node A then receives the above-mentioned topology data TD6 through the side-1 signal terminating part 21, and performs through determination. Because the own node is a terminal station, the node A inverts the through determination flag from "0" to "1" (construction), and transmits the thus-obtained topology data TD7 also in which the own node ID 'A' is added, through the side-1 signal terminating part 21 through which the topology data TD6 was received.

(8) The node B then receives the above-mentioned topology data TD7 through the side-2 signal terminating part 23. Because the side-2 signal terminating part 23 through which the topology data TD7 has been now received is opposite to the side-1 signal terminating part 21 through which the topology construction was commenced, that is, the topology data TD2 was transmitted, the node B recognizes that the topology construction has been completed, and set this topology data TD7 in the topology table.

Thus, it is possible to automatically perform topology construction needed for a BLSR in an open-ring configuration, and, based thereon, to perform construction of squelch tables.

Further, because each node of an open ring performs switching according to a BLSR protocol through the operations shown in FIG. 4, it is not necessary to construct new topology and squelch tables, and, it is not necessary to change from a linear switching protocol to a BLSR switching protocol, when an open-ring configuration is changed into a ring configuration.

Figure 9:
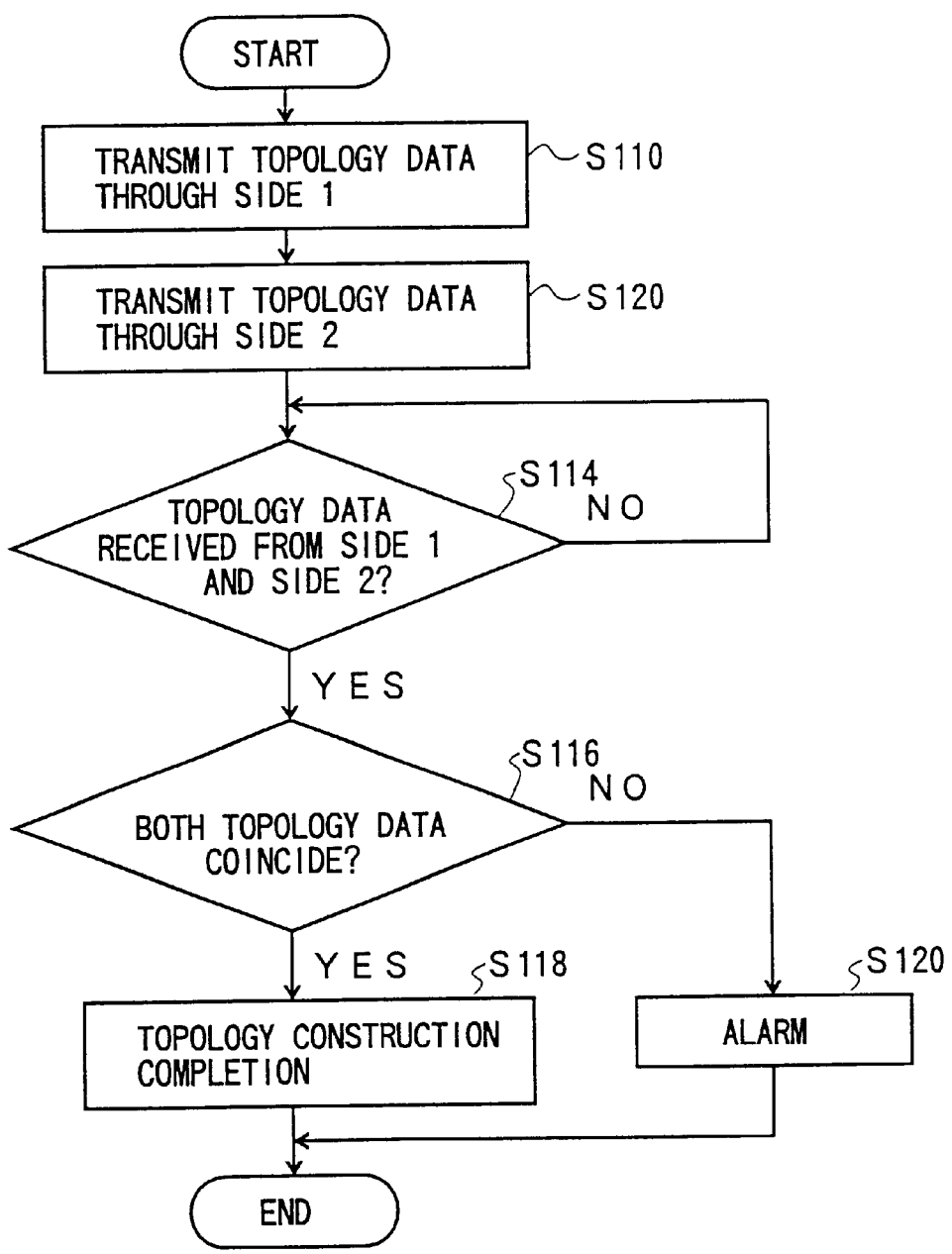
FIG. 9 shows a flow chart of a process executed by the BLSR/open-ring control part of a node to which a topology construction command is given, in a second embodiment of an open-ring topology construction method according to the present invention.

FIG. 9 shows a flow chart of a process executed by the BLSR/open-ring control part 27 of a node to which a topology construction command has been given, in a second embodiment of an open-ring topology construction method according to the present invention.

This process is commenced when a topology construction command is given.

In FIG. 9, the BLSR/open-ring control part 27 starts the side-21-direction topology data control part 26 in a step S110, sets the through determination flag to "1", that is, sets construction, and transmits the thus-obtained topology data also in which the own node ID is added, to an adjacent node through the side-1 signal terminating part 21.

Then, the BLSR/open-ring control part 27 starts the side-12-direction topology data control part 22 in a step S112, sets the through determination flag to "1", that is, sets construction, and transmits the thus-obtained topology data also in which the own node ID is added, to an adjacent node through the side-2 signal terminating part 23.

Then, in a step S114, it is determined whether or not the topology data has been received at both the side-2 signal terminating part 23 and side-1 signal terminating part 21 opposite to the side-1 signal terminating part 21 and side-2 signal terminating part 23 through which the topology data was transmitted, respectively. Then, only when the topology data has been received in both the side-2 signal terminating part 23 and side-1 signal terminating part 21, a step S116 is executed.

In the step S116, it is determined whether or not the topology data received through the side-1 signal terminating part 21 coincides with the topology data received through the side-2 signal terminating part 23. In a case of the coincidence in the step S116, it is recognized that the topology construction has been completed, in a step S118, the received topology data is set in the topology table of the BLSR/open-ring control part 27, and the process is finished.

In a case of not coincidence in the step S116, an alarm is output in a step S120, abnormality is reported to an operator, and the process is finished.

In this embodiment, node connection information of topology data is set to each node when the topology data in one circulation direction coincides with the topology data in the other circulation direction. Accordingly, it is possible to collect precise node connection information and set it to each node.

Figure 10:
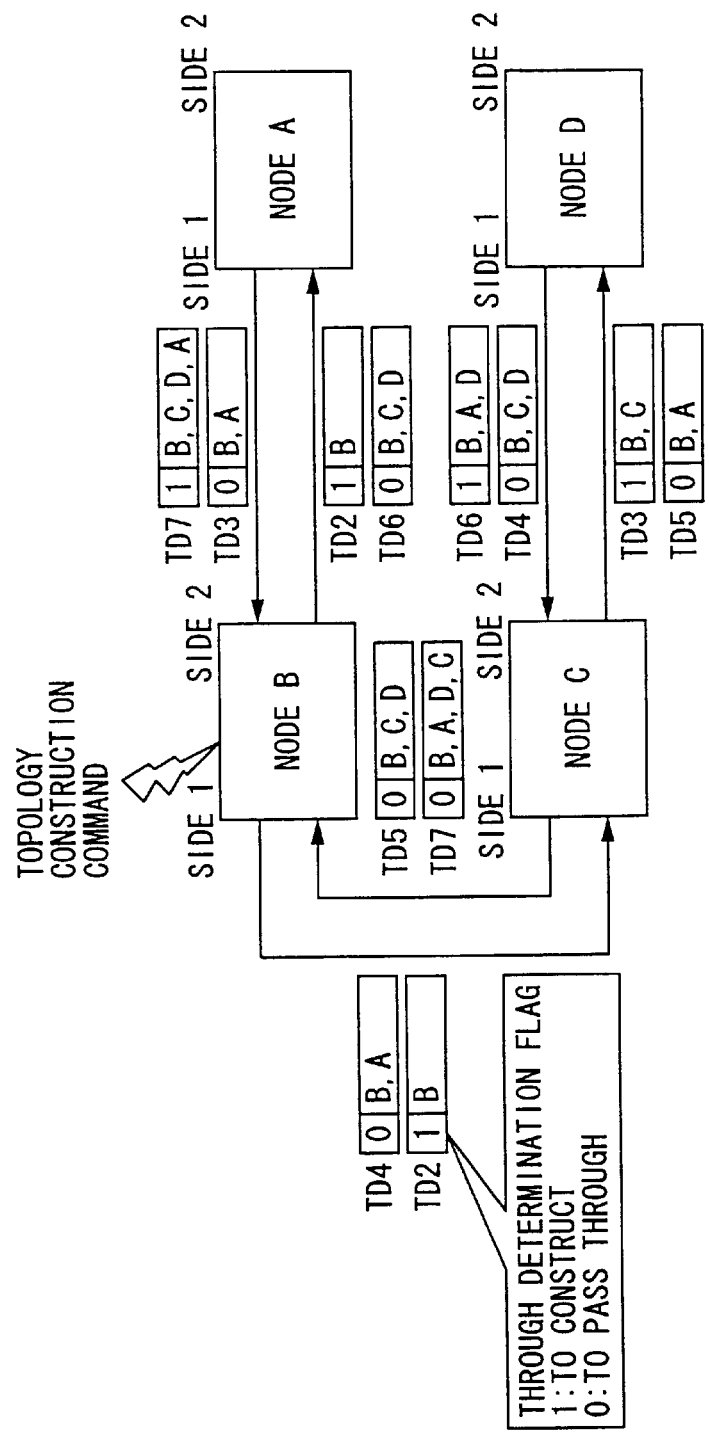
FIG. 10 illustrates operations of the second embodiment of the open-ring topology construction method according to the present invention.

FIG. 10 illustrates operations of the above-described second embodiment of the open-ring topology construction according to the present invention.

In FIG. 10, the side-1 signal terminating part 21 of a node A and the side-2 signal terminating part 23 of a node B are connected via optical fibers, the side-1 signal terminating part 21 of the node B and the side-1 signal terminating part 21 of a node C are connected via optical fibers, and the side-2 signal terminating part 23 of the node C and the side-1 signal terminating part 21 of a node D are connected via optical fibers, and thus, an open ring is configured thereby.

(1) An operator gives a topology construction command to the node B, for example.

(2) The node B then transmits topology data TD2 and topology data TD2' in each of which the through determination flag is set to "1", that is, construction is set, through the side-1 signal terminating part 21 and the side-2 signal terminating part 23 in both directions.

Flow of Topology Data on Side 1

(3a) The node C then receives the above-mentioned topology data TD2 through the side-1 signal terminating part 21 and performs through determination. Because the through determination flag is "1", that is, construction is set, the node C transmits topology data TD3 in which the own node ID 'C' is added, through the side-2 signal terminating part 23.

(4a) The node D then receives the above-mentioned topology data TD3 through the side-1 signal terminating part 21. Because the own node is a terminal station, the node D inverts the through determination flag from "1" to "0" (passing through), and transmits the thus-obtained topology data TD4 also in which the own node ID 'D' is added, through the side-1 signal terminating part through which the topology data TD3 was received.

(5a) The node C then receives the above-mentioned topology data TD4 through the side-2 signal terminating part 23, and performs through determination. Because the through determination flag is "0", that is, passing through is set, the node C transmits the unchanged topology data TD5 through the side-1 signal terminating part 21.

(6a) The node B then receives the above-mentioned topology data TD5 through the side-1 signal terminating part 21, and performs through determination. Because the through determination flag is "0", that is, passing through is set, the node B transmits the unchanged topology data TD6 through the side-2 signal terminating part 23.

(7a) The node A then receives the above-mentioned topology data TD6 through the side-1 signal terminating part 21, and performs through determination. Because the own node is a terminal station, the node A inverts the through determination flag from "0" to "1" (construction), and the thus-obtained transmits topology data TD7 also in which the own node ID 'A' is added, through the side-1 signal terminating part 21 through which the topology data TD6 was received.

(8a) The node B then receives the above-mentioned topology data TD7 through the side-2 signal terminating part 23. Because the side-2 signal terminating part 23 through which the topology data TD7 has been now received is opposite to the side-1 signal terminating part 21 through which the topology construction was commenced, that is, the topology data TD2 was transmitted, the node B recognizes that the topology construction has been completed.

Flow of Topology Data on Side 2

(3b) The node A receives the above-mentioned topology data TD2' through the side-1 signal terminating part 21. Because the own node is a terminal station, the node A inverts the through determination flag from "1" to "0" (passing through), and transmits the thus-obtained topology data TD3' also in which the own node ID 'A' is added, through the side-1 signal terminating part 21 through which the topology data TD2' was received.

(4b) The node B then receives the above-mentioned topology data TD3' through the side-1 signal terminating part 23 and performs through determination. Because the through determination flag is "0", that is, passing through is set, the node B transmits the unchanged topology data TD4' through the side-1 signal transmitting part 21.

(5b) The node C then receives the above-mentioned topology data TD4' through the side-1 signal terminating part 21, and performs through determination. Because the through determination flag is "0", that is, passing through is set, the node C transmits the unchanged topology data TD5' through the side-2 signal terminating part 23.

(6b) The node D then receives the above-mentioned topology data TD5' through the side-1 signal terminating part 21. Because the own node is a terminal station, the node D inverts the through determination flag from "0" to "1" (construction), and transmits the thus-obtained topology data TD6' also in which the own node ID 'D' is added, through the side-1 signal terminating part 21 through which the topology data TD5' was received.

(7b) The node C then receives the above-mentioned topology data TD6' through the side-2 signal terminating part 23, and performs through determination. Because the through determination flag is "1", that is, construction is set, the node C transmits topology data TD7' in which the own node ID 'C' is added, through the side-1 signal terminating part 21.

(8b) The node B then receives the above-mentioned topology data TD7' through the side-1 signal terminating part 21. Because the side-1 signal terminating part 21 through which the topology data TD7' has been now received is opposite to the side-2 signal terminating part 23 through which the topology construction was commenced, that is, the topology data TD2' was transmitted, the node B recognizes that the topology construction has been completed.

(9) The node B compares the topology data TD7 with the topology data TD7' received from both sides, and, when TD7 is the same as TD7', the node B determines that this data is a proper one, and set this topology data TD7 in the topology table.

Operations at a time of ring fault occurrence in an open ring, by a method according to the present invention will now be described, with reference to FIGS. 11, 12 and 13.

Figure 11:
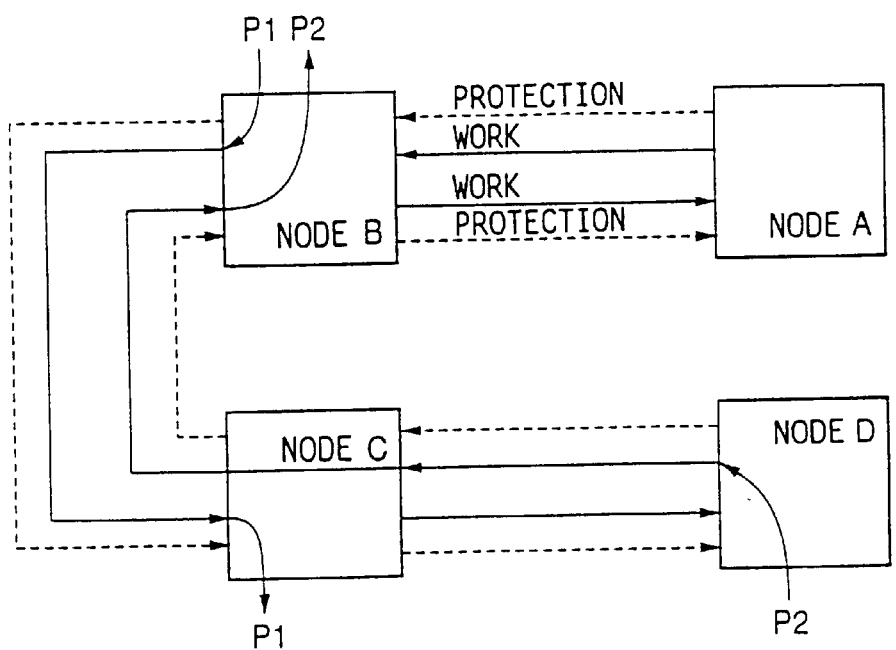
FIGS. 11, 12 and 13 illustrate operations, according to the present invention, performed at a time of a ring fault occurrence in an open ring.

FIG. 11 shows a normal state, in which the side-1 signal terminating part 21 of a node A and the side-2 signal terminating part 23 of a node B are connected via two optical fibers, the side-1 signal terminating part 21 of the node B and the side-1 signal terminating part 21 of a node C are connected via two optical fibers, the side-2 signal terminating part 23 of the node C and the side-1 signal terminating part 21 of a node D are connected via two optical fibers, and, an open ring is thus configured thereby.

In the figure, a work (in use) line of the optical fibers is indicated by a solid line, while a protection (or spare) line thereof is indicated by a broken line. Further, in the node B, a path P1 from the outside is added or inserted into the open ring. In the node C, the path P1 is dropped or extracted from the open ring to the outside. In the node D, a path P2 from the outside is added or inserted into the open ring. In the node B, the path P2 is dropped or extracted from the open ring to the outside.

Figure 12:
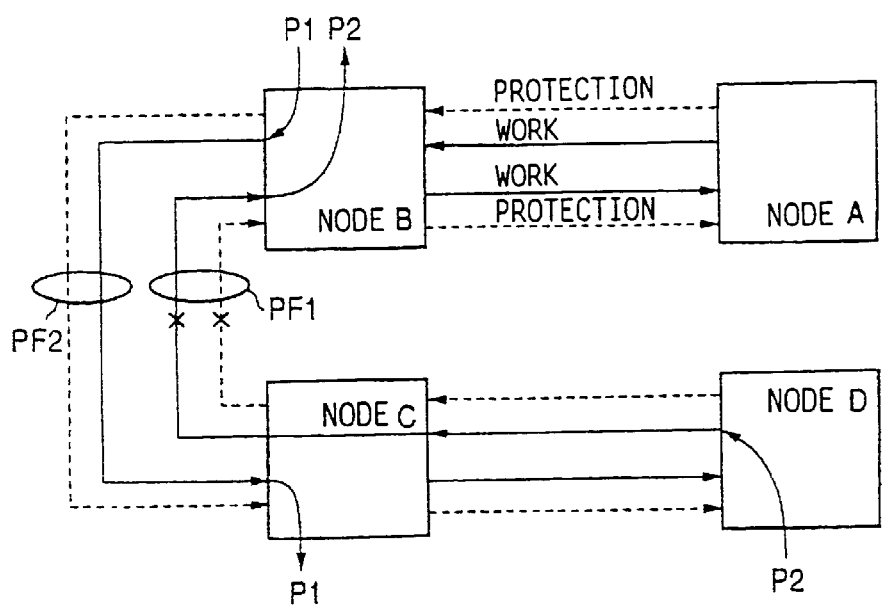

Then, as shown in FIG. 12, it is assumed that a ring fault occurs such that the work line and protection line cannot be used (a fault such that only a work line cannot be used being called a span fault) at the portions indicated by the x signs of the optical fibers PF1 connecting the node B and node C. When the ring fault occurs, the node B to which the present invention is applied detects the ring fault of the optical fibers PF1. However, because the node B is in the lockout-work ring implementation condition through execution of the step S26 shown in FIG. 4, the node B does not perform relieving operation through ring switch and span switch according to the manner of BLSR for the path P2. Thereby, it is possible to prevent the path P1 passing through the optical fibers PF2 through which no fault has occurred between the nodes B and C from being disconnected.

In contrast thereto, a case will now be considered in which, in an open ring, nodes for a normal BLSR in which no lockout-work ring is implemented are used.

Figure 13:
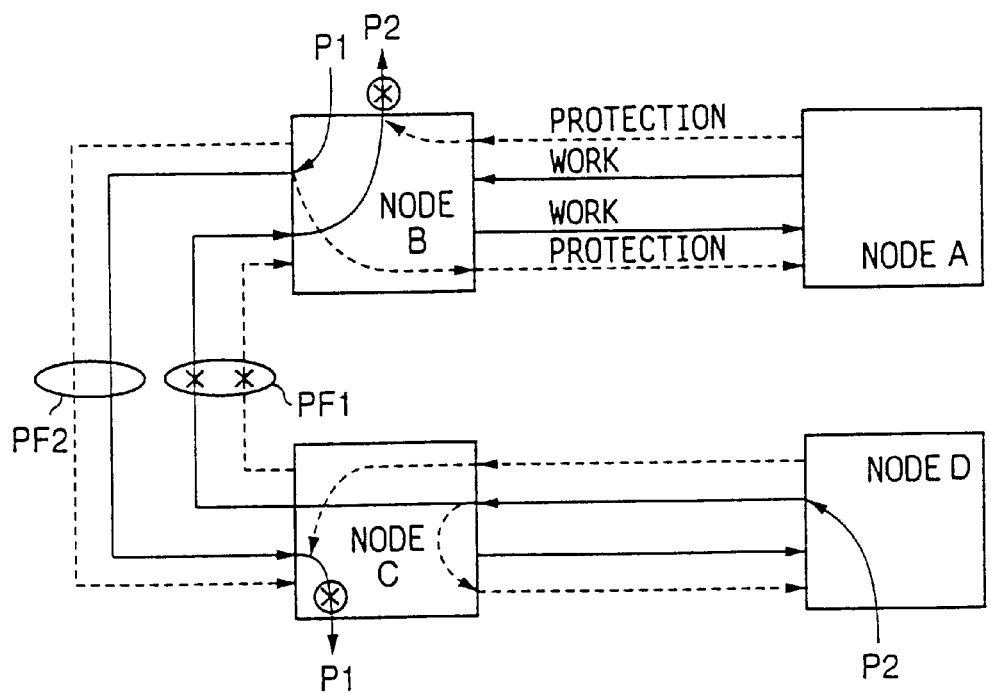

In a normal BLSR, operations are performed assuming that the nodes A and D shown in FIG. 13 are connected via two optical fibers directly. Therefore, when a ring fault occurs at portions indicated by the x signs of optical fibers PF1 connecting the nodes B and C as shown in FIG. 13, the node B branches the path P1, and thus sets a path P1 which would reach the node C through the nodes A and D, adds fault information AIS to the path P1 sent out to the work line of the optical fibers PF2, and performs control such as to squelch (delete) the path P1 passing through the optical fibers PF2 so as to drop the path P1 which would reach the node C through the protection line.

However, because the nodes A and D are not connected actually in this open ring, it is not possible to drop the path P1 in the node C, and, as a result, the path P1 passing through the optical fibers PF2 along which no fault has occurred is disconnected. In FIG. 13, the positions at which squelch is performed are indicated by the x signs encircled by circles.

Figure 14:
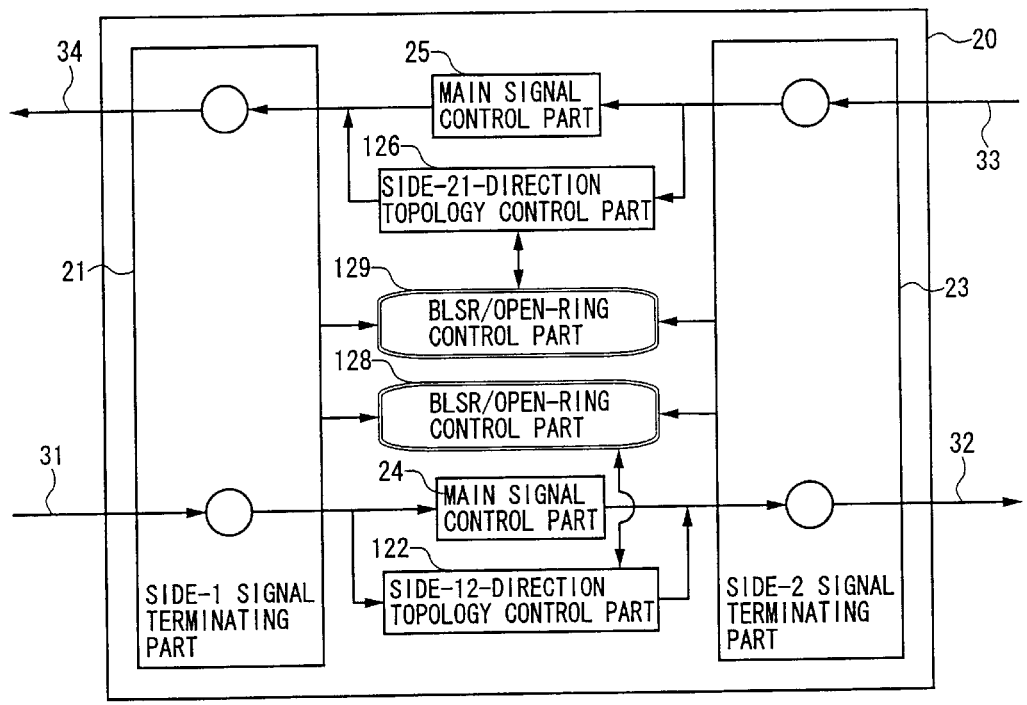
FIG. 14 shows a block diagram of a second embodiment of a node apparatus according to the present invention.

FIG. 14 shows a block diagram of a second embodiment of a node apparatus according to the present invention.

In FIG. 14, the same reference numerals are given to parts the same as those shown in FIG. 3.

In FIG. 14, in the node apparatus 20, a side-1 signal terminating part 21 receives a main signal and topology data coming through an optical fiber 31, provides the topology data to a side-12-direction topology control part 122 and provides the main signal to a main signal control part 24.

The side-12-direction control part 122 provides the received topology signal to a BLSR/open-ring control part 128, and performs processing of the topology data, that is, adding a node ID (that is, collection of node connection information) and holding of the topology data (that is, setting of the node connection information) based on control by the BLSR/open-ring control part 128.

The topology data output by the side-12-direction topology control part 122 and the main signal output from the main signal control part 24 are sent out to an optical fiber 32 through a side-2 signal terminating part 23.

Further, the side-2 signal terminating part 23 receives a main signal and topology data coming through an optical fiber 33, provides the topology data to a side-21-direction topology control part 126 and provides the main signal to a main signal control part 25.

The side-21-direction control part 126 provides the received topology signal to a BLSR/open-ring control part 129, and performs processing of the topology data, that is, adding a node ID and holding of the topology data based on control by the BLSR/open-ring control part 129.

The topology data output by the side-21-direction topology control part 126 and the main signal output from the main signal control part 25 are sent out to an optical fiber 34 through the side-1 signal terminating part 21.

Each of the BLSR/open-ring control parts 128 and 129 holds BLSR/open-ring identification information, determination information as to whether or not the own node is a terminal station, and information as to whether the own node is a master or a slave.

The BLSR/open-ring identification information can be changed by an operator. Further, each of the BLSR/open-ring control parts 128 and 129 has information of connection of optical fibers provided by each of the side-1 signal terminating part 21 and side-2 signal terminating part 23, and starts execution of the switching control process shown in FIG. 4 when setting of the BLSR/open-ring identification information is changed or a fault occurs.

Thus, each of the BLSR/open-ring control parts 128 and 129 independently holds the BLSR/open-ring identification information, determination information as to whether or not the own node is a terminal station and information as to whether the own node is a master or slave. Accordingly, it is possible to perform setting of master/slave independently for the side-12 direction and side-21 direction, and to set topology data individually for the side-12 direction and side-21 direction. Thus, degree of freedom in setting of topology data is improved.

Figure 15:
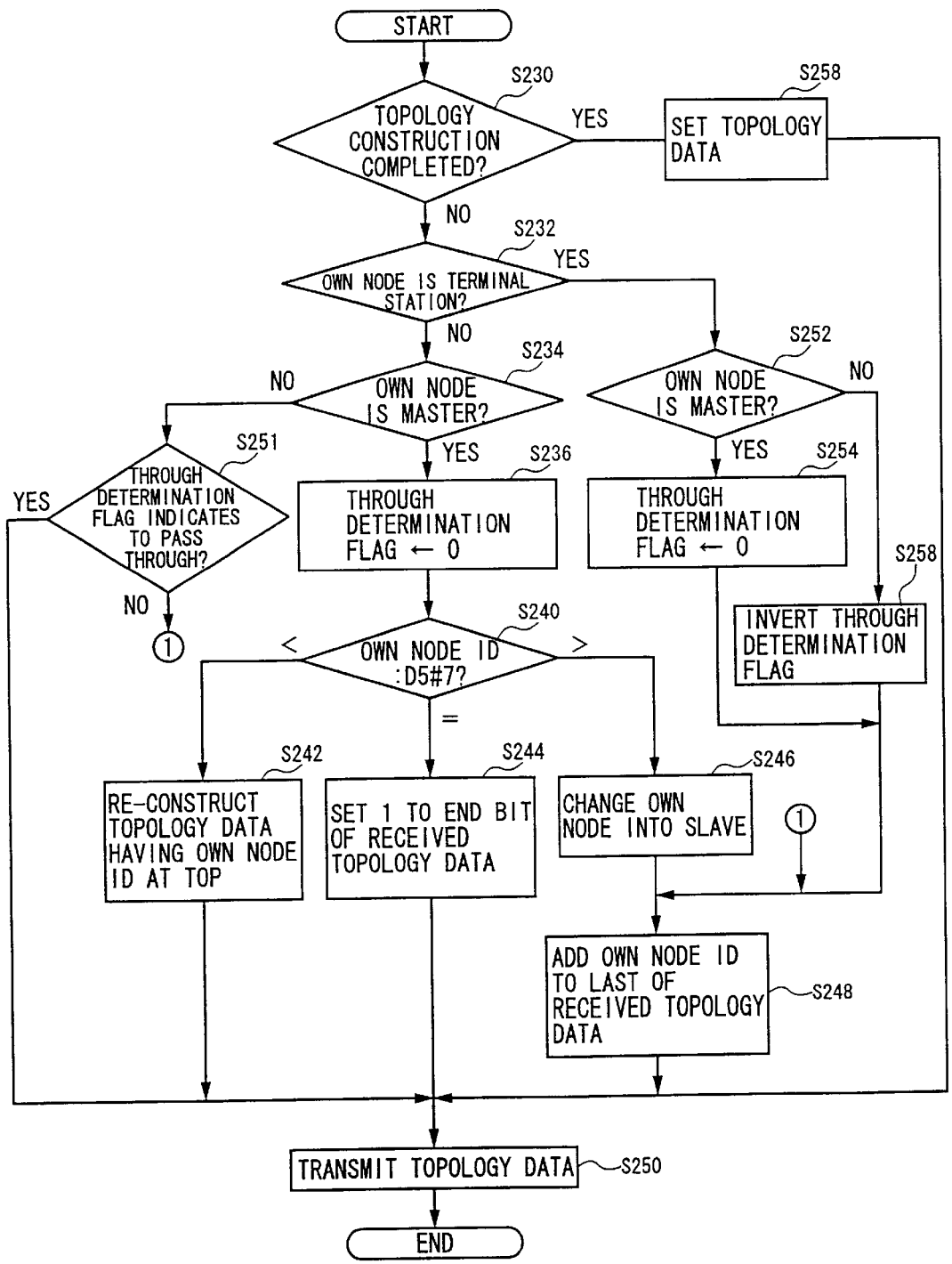
FIG. 15 shows a flow chart of one embodiment of a topology automatic construction process executed by each of a side-12-directyion topology control part and a side-21-directyion topology control part shown in FIG. 14.

FIG. 15 shows a flow chart of a topology automatic construction process in one embodiment executed by each of the side-12-direction topology control part 122 and side-21-direction topology control part 126.

This process is commenced at a time of reception of topology data. When a topology construction command is given, topology data is generated in which the own node ID is inserted into the D5#7 byte, the end bit is dropped into "0", and "0"is set in all the other bytes.

In FIG. 15, first, in a step S230, it is determined whether or not the end bit B4 of the node number NN of the received topology data is "1", and indicates that the node connection information (or topology) of all the nodes constituting the ring (which may be an open ring) has been already collected, and the topology data is to be set in a topology table.

When the end bit B4 is "0", and indicates that the node connection information (or topology) of respective nodes are now being collected, a step S232 is then executed.

In the step S232, it is determined whether the own node is a terminal station. When the determination information sent from the BLSR/open-ring control part 128 or 129 indicates that the own node is not a terminal station, a step S234 is performed.

Then, in the step S234, it is determined whether or not the own node is a master. When the determination information sent from the BLSR/open-ring control part 128 or 129 indicates that the own node is a master, the through determination flag B1 of the node number NN of the topology data is set to "0" (passing through) in a step S236, and a step S240 is executed. However, when the determination information sent from the BLSR/open-ring control part 128 or 129 indicates that the own node is not a master, a step S251 is executed.

In the step S240, the own node ID is compared with the contents of the D5#7 byte (node ID at the top of the topology data part) of the received topology data.

When the own node ID<D5#7, the own node ID is inserted into the D5#7 byte at the top portion of the topology data part, the end bit is dropped to "0", and all the other bytes of the topology data are set to "0", in a step S242. Thus, the topology data is re-constructed.

However, when the own node ID=D5#7, "1" is set to the end bit of the NN byte (node number NN) of the received topology data, and all the other bytes of the received topology data are kept unchanged, in a step S244. Thus, topology construction completion is indicated thereby.

On the other hand, when the own node ID>D5#7, and the own node ID cannot be the top of the topology data part of the received topology data, the determination information held in the BLSR/open-ring control part 128 or 129 is changed from a master into a slave, in a step S246, "1" is added to the value of the number of nodes of the node number NN of the received topology data, in a step S248, and, thus, the value of the number of nodes of the node number NN is updated. Then, the own node ID is inserted (added) to the byte at the end which is the X(=NN+1)-th from the D5#7 byte of the topology data part.

After the step S242, S244 or S248 is executed, a step S250 is executed. Then, the topology data is transmitted to an adjacent node, and the process is finished. At this time, in a case where the own node is a terminal station, that transmission is made through the side (side-1 signal terminating part 21 or side-2 signal terminating part 23) through which the topology data was received. However, in a case where the own node is not a terminal station (but a repeating station) and the topology data was received through the side-1 signal terminating part 21 for example, that transmission is made through the opposite side (side-2 signal terminating part 23 in the example).

In the step S234, when the own node is determined as not being a master, that is, as being a slave, it is determined in a step S251 whether or not the through determination flag B1 of the node number NN of the topology data is "0" and instructs to cause to pass through. When the through determination flog is "1" and instructs to construct (collect), a step S248 is executed, that is, "1" is added to the value of the number of nodes of the node number NN of the received topology data and thus the value of the number of nodes of the node number NN is updated, the own node ID is inserted (added) into the byte at the end which is the X(=NN+1)-th from the D5#7 byte of the topology data part, and the step S250 is executed.

However, when the through determination flag is "0"and instructs to cause to pass through in the step S251, the step S250 is executed, that is, the topology data is transmitted to an adjacent node, and the process is finished.

On the other hand, in the step S232, when it is determined that the own node is a terminal station, a step S252 is performed, that is, it is determined whether or not the own node is a master. When the determination information sent from the BLSR/open-ring control part 128 or 129 indicates that the own node is a master, a step S254 is executed, that is, the "0" (passing through) is set to the through determination flag B1 of the node number NN of the topology data, and the step S248 is executed.

However, when the determination information sent from the BLSR/open-ring control part 128 or 129 indicates that the own node is not a master in the step S252, a step S256 is executed, that is, the value of the through determination flag B1 is inverted. Then, the step S248 is executed.

In the step S230, when the end bit B4 of the received topology data is "1" and indicates that the node connection information (or the topology) of all the nodes has been already collected, a step S258 is executed, that is, the contents of the D5#7 through D7#6 and the number of nodes of the node number NN of the received topology data are sent to the BLSR/open-ring control part 128 or 129, and are held in the topology table. Then, the step S250 is executed, that is, the topology data having already undergone the topology construction (collection) is made to circulate in the ring again, and is set in the topology table of each node. When the master node receives the topology data having the end bit B4 of "1", this node discards this topology data, and finishes the topology automatic construction.

Figure 16:
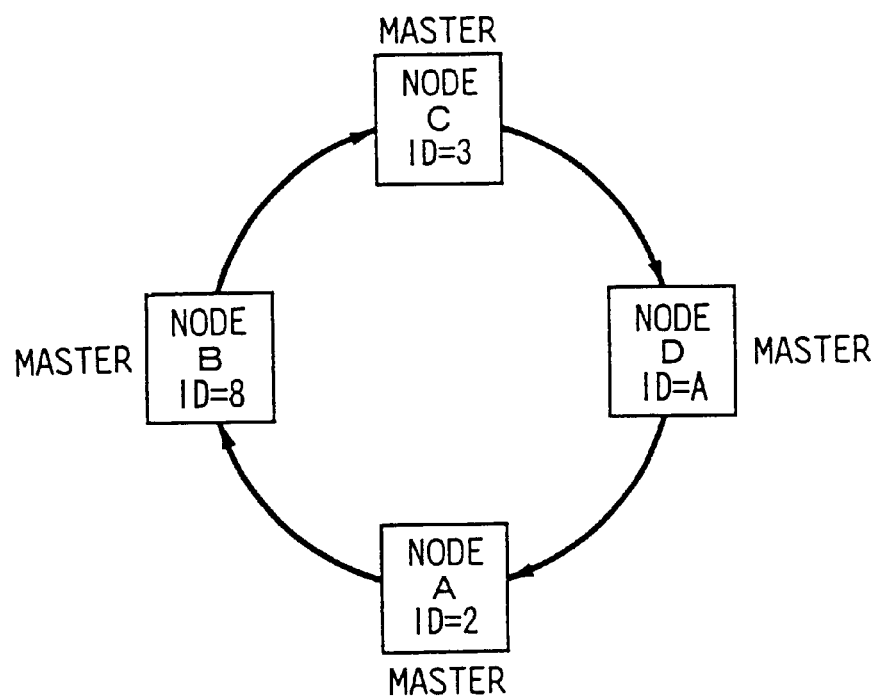
FIG. 16 shows a state of topology construction in a case where respective nodes constitute a BLSR.

Topology construction in a case where a BLSR is configured using the side-12-direction topology control part 122 and BLSR/open-ring control part 128 of each of a node A (node ID=2), a node B (node ID=8), a node C (node ID=3) and a node D (node ID=A) (where each node ID is indicated by hexadecimal notation) as shown in FIG. 16 will now be described using a time table of topology data shown in FIG. 17. Initially, each of the nodes A, B, C and D is set as a master.

At the time T01 shown in FIG. 17, topology data in which the node number NN=00 (in hexadecimal notation) and the minimum node ID (=2) is inserted in the top D5#7 of the topology data part is transmitted from the node A to the node B.

Then, at the subsequent time T02, because the own node ID is larger than the D5#7 of the received topology data, the node B is changed into a slave, and topology data in which the number of nodes is changed into "1" and the node number NN=01 (in hexadecimal notation), and the node ID of the value 8 is inserted into D5#8 at the end of the topology data part is transmitted from the node B to the node C.

Then, at the time T03, the node C is changed into a slave, and topology data in which the node number NN=02 (in hexadecimal notation) and the node ID of the value 3 is inserted into D5#9 at the end of the topology data part is transmitted from the node C to the node D.

Then, at the subsequent time T04, the node D is changed into a slave, and topology data in which the node number NN=03 (in hexadecimal notation) and the node ID of the value A is inserted into D5#10 at the end of the topology data part and thus the arrangement of the node IDs is '2, 8, 3, A' is transmitted from the node D to the node A.

Thereby, at the time T05, the end bit of the node number NN becomes "1" (NN=13) in the node A. Then, in the times T06 through T09, the topology data in which the arrangement of the node IDs is '2, 8, 3, A' as mentioned above is set in the topology table of each node.

Figure 18:
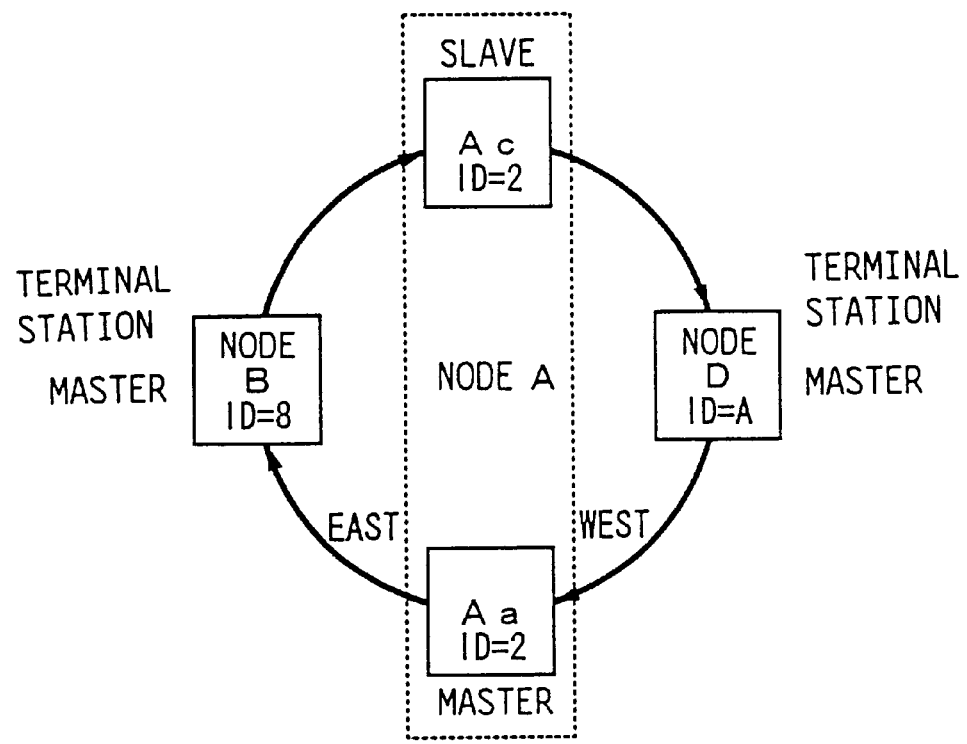
FIG. 18 shows a state of topology construction in a case where respective nodes constitute an open ring.

Topology construction in a case where, as shown in FIG. 18, the side-12-direction topology control part 122 and BLSR/open-ring control part 128 which are referred to as Aa of a node A (node ID=2), the side-12-direction topology control part 122 and BLSR/open-ring control part 128 of a node B (node ID=8), the side-21-direction topology control part 126 and BLSR/open-ring control part 129 which are referred to as Ac of the node A (node ID=2) and the side-12-direction topology control part 122 and BLSR/open-ring control part 128 of a node D (node ID=A) are used (where each node ID is in hexadecimal notation), the nodes B and D are terminal stations, and thus an open ring is configured thereby, will now be described, using a time table of topology data shown in FIG. 19.

Initially, Aa of the node A is set as a master, Ac thereof is set as a slave, and each of the nodes B and C is set as a master.

At the time T01 in FIG. 19, because the through determination flag is "0", topology data in which the node number NN=00 (hexadecimal notation) and the minimum node ID (=2) is inserted into the top D5#7 of the topology data part is transmitted from the Aa of the node A to the node B.

Then, at the subsequent time T02, because the own node ID is larger than D5#7 of the received topology data, the node B is changed into a slave, and topology data in which the node number NN=81 (in hexadecimal notation) because the number of nodes is changed into "1" and the through determination flag is inverted into "1", and the node ID of the value 8 is inserted into D5#8 at the end of the topology data part is transmitted from the node B to Ac of the node A.

Then, at the time T03, the topology data, having passed through Ac of the node A because the through determination flag is "1", in which the node number NN=81 (hexadecimal notation) and the arrangement of the node IDs is '2, 8, 0, 0' is transmitted from Ac of the node A to the node D.

At the subsequent time T04, the node D is changed into a slave, and topology data in which the node number NN=02 (in hexadecimal notation) because the number of nodes is changed into "2" and the through determination flag is inverted into "0", the node ID of the value A is inserted into D5#9 at the end of the topology data part and thus the arrangement of the node IDs is '2, 8, A, 0' is transmitted from the node D to Aa of the node A.

Thereby, at the time T05, the end bit of the node number NN becomes "1" (NN=12) in Aa of the node A. Then, at the times T06 through T09, the topology data in which the arrangement of the node IDs is '2, 8, A, 0' mentioned above is set in the topology table of each node.

Figure 20:
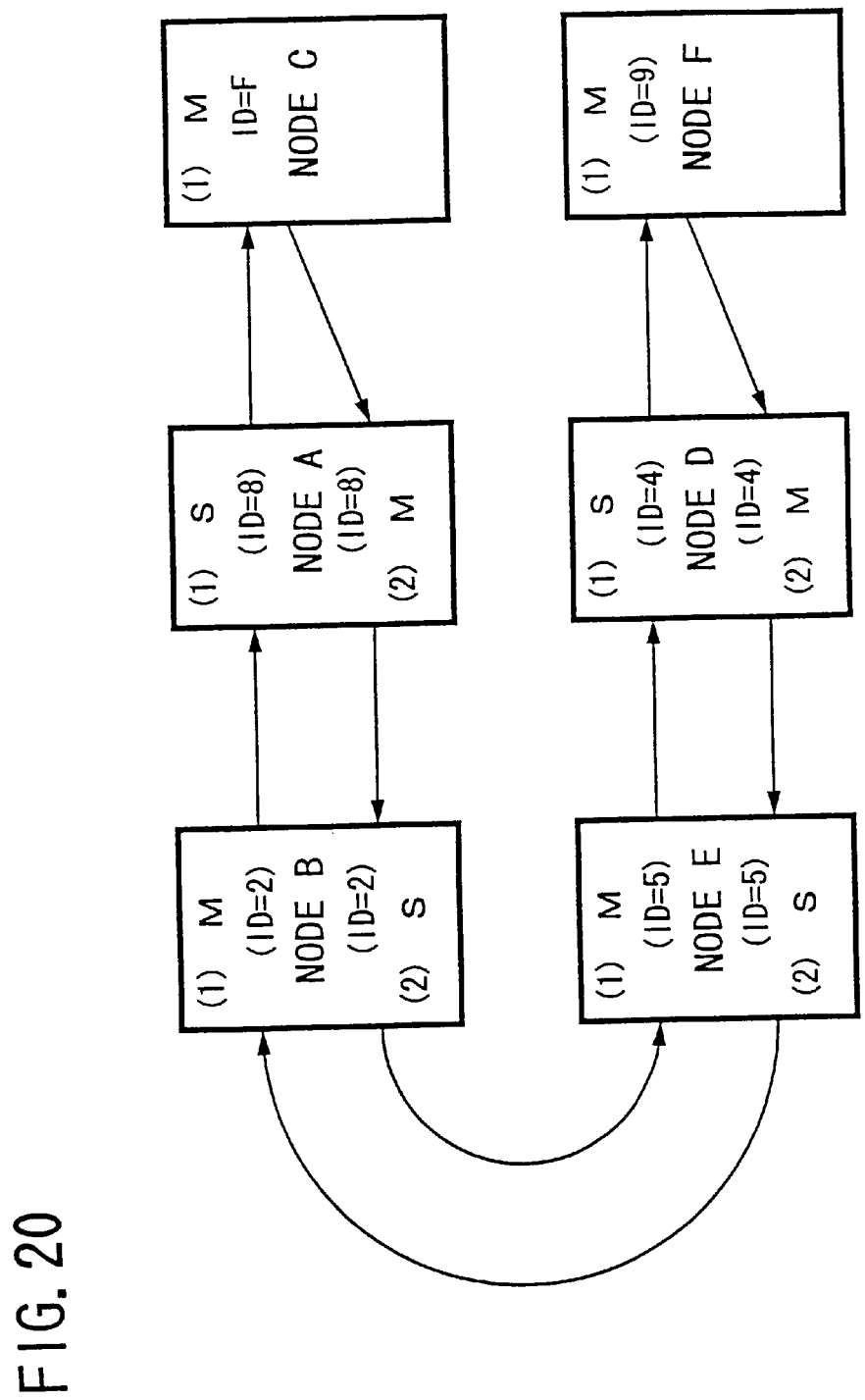
FIG. 20 shows another state of topology construction in a case where respective nodes constitute an open ring.

Topology construction in a case where, as shown in FIG. 20, an open ring is configured in which nodes C and F of the node C (node ID=F), a node A (node ID=8), a node B (node ID=2), a node E (node ID=5), a node D (node ID=4) and the node F (node ID=9) are terminal stations (where each node ID is in hexadecimal notation), will now be described using a time table of topology data shown in FIG. 21.

Initially, in the node C, a BLSR/open-ring control part 128 on the side-12-direction side (indicated by '(1)' in the figures) is set to a master (M), and the side-21-direction side is not used.

In the node A, a BLSR/open-ring control part 128 on the side-12-direction side is set to a slave (S), and, also, a BLSR/open-ring control part 129 on the side-21-direction side (indicated by '(2)' in the figures) is set to a master.

In the node B, a BLSR/open-ring control part 128 on the side-12-direction side is set to a master, and, also, a BLSR/open-ring control part 129 on the side-21-direction is set to a slave.

In the node E, a BLSR/open-ring control part 128 on the side-12-direction side is set to a master, and, also, a BLSR/open-ring control part 129 on the side-21-direction is set to a slave.

In the node D, a BLSR/open-ring control part 128 on the side-12-direction side is set to a slave, and, also, a BLSR/open-ring control part 129 on the side-21-direction is set to a master.

In the node F, a BLSR/open-ring control part 128 on the side-12-direction side is set to a master, and the side-21-direction side is not used.

At the time T1 shown in FIG. 21, topology data in which the node number NN=00 (in hexadecimal notation) because the through determination flag is "0", and the minimum node ID (=2) is inserted into the top D5#7 of the topology data part is transmitted from the side-21-direction side of the node B to the side-12-direction side of the node E, and, also, is transmitted from the side-12-direction side of the node B to the side-12-direction side of the node A.

At the subsequent time T2, because the own node ID is larger than the D5#7 of the received topology data, each of the BLSR/open-ring control part 128 on the side-12-direction side of the node C, the BLSR/open-ring control part 128 on the side-12-direction side of the node E and the BLSR/open-ring control part 128 on the side-12-direct side of the node F is changed into a slave from the master.

Further, at the time T4, because the own node ID is larger than the D5#7 of the received topology data, the BLSR/open-ring control part 129 on the side-21-direction side of the node A is changed from the master into a slave. Then, at the subsequent time T5, because the own node ID is larger than the D5#7 of the received topology data, the BLSR/open-ring control part 129 on the side-21-direction side of the node D is changed from the master into a slave.

As a result, at the time T5, only the BLSR/open-ring control part 128 on the side-12-direction side of the node B having the minimum node ID (=2) remains as the master. Then, topology data re-constructed as a result of the minimum node ID (=2) being inserted into the top D5#7 of the topology data part thereof is transmitted from the side-12-direction side of the node B to the side-12-direction side of the node A.

Then, at the time T10, topology data having the arrangement of the node IDs of '2, 8, F, 9, 4, 5' is transmitted from the side-21-direction side of the node E to the side-12-direction side of the node B.

Thereby, at the time T11, the end bit of the node number NN becomes "1" (NN=15) in the side-12-direction side of the node B. Then, at the times T12 through T19, the topology data having the arrangement of the node IDs of '2, 8, F, 9, 4, 5' mentioned above is set in the topology table of each node.

Then, at the time T20, this topology data is circulated throughout the open ring and thus returns to the side-12-direction side of the node B. Thus, all the process of the topology construction is finished.

Thus, as a result of comparison of the own node ID with the D5#7 of the received topology data being made in a master and the own node being changed into a slave when the own node is larger than D5#7, it is possible to reduce a plurality of masters, if they are, to a single master.

Further, as a result of a fixed value of "0"being set in the through determination flag in a master and the through determination flag being inverted in a terminal station, it is possible to perform topology contraction such that single topology data is obtained.

It is noted that the step S38 corresponds to a collection/passing control part; the step S36 corresponds to a turning/passing control part; the step S100 corresponds to a one-direction sending-out part; the steps S110, S112 correspond to a both-direction sending-out part; the step S116 corresponds to a comparing part; the step S26 corresponds to a lockout-work-ring part; the step S236, S254 correspond to a fixed-value setting part; the step S246 corresponds to a changing part; the side-12-direction topology control part 122 and BLSR/open-ring control part 128 correspond to a part sending out topology data in one direction and circulating it; and the side-21-direction topology control part 126 and BLSR/open-ring control part 129 correspond to a part sending out topology data in the other direction and circulating it The present invention is not limited to the above-described embodiments, and variations and modifications may be made without departing from the scope of the present invention.

The present application is based on Japanese priority applications Nos. 2000-061092 and 2000-225728, filed on Mar. 6, 2000 and Jul. 26, 2000, respectively, the entire contents of which are hereby incorporated by reference.

What is claimed is:

1. A ring configuring method of configuring a network in which a plurality of nodes are connected linearly, and performing topology construction for said ring by circulating topology data through the respective nodes and collecting connection information of the respective nodes, said method comprising the steps of:

a) providing in the topology data a flag indicating whether the connection information is to be collected in each node;

b) inverting the flag at a terminal station which is an end node of the open ring, and turning the topology data there;

c) causing the topology data to pass through a node other than any terminal station, as it is; and d) adding the connection information to the topology data in each node according to the flag, and performing topology construction.

2. The ring configuring method as claimed in claim 1, further comprising the steps of:

e) sending the topology data in any direction from any node, and circulating the topology data in the ring; and f) receiving said topology data by said node in a direction opposite to that of the step e), and performing topology construction.

3. The ring configuring method as claimed in claim 1, further comprising the steps of:

e) sending the topology data in both directions from any node, and circulating the topology data in the ring; and f) configuring the topology when the topology data received by said node in directions opposite to those of the step e), respectively, coincides.

4. A node apparatus in a network having a configuration of a ring in which a plurality of nodes are connected linearly, comprising:

a collecting/passing control part receiving topology data which circulates in said ring, and transmitting said topology data after adding an own node ID when a flag provided in said topology data indicates to collect connection information, but causing said topology data to pass through the own apparatus when said flag indicates not to collect the connection information; and a turning/passing control part turning said topology data after inverting said flag in a case where the own apparatus is a terminal station which is an end node of the open ring, but causing said topology data to pass through the own apparatus leaving the flag as it is in a case where the own apparatus is not any terminal station.

5. The node apparatus as claimed in claim 4, further comprising a one-direction transmitting part transmitting said topology data in one direction, and circulating said topology data in the ring, and receiving said topology data in a direction opposite to said one direction, and performing topology construction.

6. The node apparatus as claimed in claim 4, further comprising:

a both-direction transmitting part transmitting said topology data in both directions, and circulating said topology data in the ring; and a comparing part comparing the topology data received in directions opposite to said both directions, respectively, and performing topology construction when a result of comparison of said comparing part is a coincidence.

7. The node apparatus as claimed in claim 4, further comprising a lockout-work ring part stopping ring switching of a manner of a bidirectional line switched ring when a ring fault occurs such that neither a work line nor a protection line connected to either side of the own apparatus can be used.

8. The node apparatus as claimed in claim 4, further comprising:

a fixed-value setting part setting a fixed value to said flag when the own apparatus is set as a master; and a changing part comparing the node ID of the own apparatus with the top node ID of the received topology data when the own apparatus is set as a master, and changing the own apparatus to a slave when the own apparatus cannot become the top of said topology data.

9. The node apparatus as claimed in claim 8, setting as to whether the own apparatus is a master or a slave independently in a part transmitting said topology data in one direction and circulating said topology data in said ring and another part transmitting said topology data in the other direction and circulating said topology data in said ring.

* * * * *